Aug. 30, 1932.  V. G. APPLE  1,875,204
COMMUTATOR AND METHOD OF MAKING IT
Filed July 5, 1928
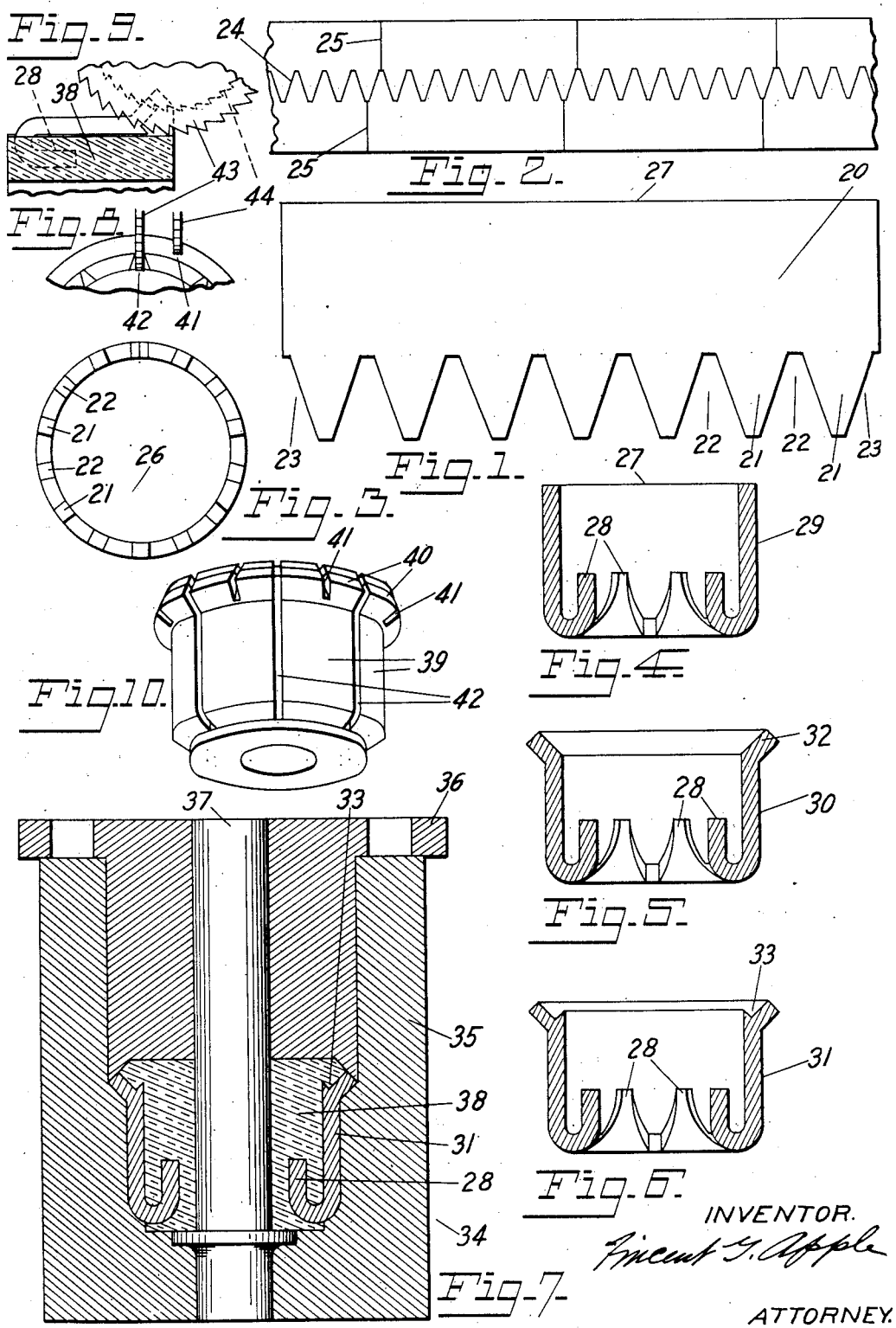

Patented Aug. 30, 1932

1,875,204

UNITED STATES PATENT OFFICE

VINCENT G. APPLE, OF DAYTON, OHIO

COMMUTATOR AND METHOD OF MAKING IT

Application filed July 5, 1928. Serial No. 290,680.

This invention relates to improvements in commutators, and particularly to those comprising a plurality of segments held in spaced relation by a core of insulation molded in situ.

An object of the invention is to generally improve the commutator structure.

Another object is to produce a finished commutator with a minimum of labor.

Still another object is to so cut the commutator material that none will be wasted.

Further objects and other meritorious features of the invention will become apparent as the invention is described in detail and reference is made to the drawing, wherein—

Fig. 1 shows the outline of a sheet metal blank from which the metal portion of my commutator is made.

Fig. 2 shows how commercial ribbon stock of uniform width and thickness may be cut apart into a plurality of commutator blanks without waste.

Fig. 3 shows a blank Fig. 1 bent to compose a cylindrical ring having teeth at one end, the other end being plain.

Fig. 4 is a cross section thru a commutator ring after the teeth are bent inwardly.

Fig. 5 is a cross section thru the ring after the plain end has been flared out to provide risers for the commutator.

Fig. 6 shows how the plain end of the ring may be modified to provide projections for the core to engage.

Fig. 7 is a cross section thru a mold employed to place the core of insulation.

Fig. 8 is a fragmentary end view of a commutator with a large and a small saw cutting the segment apart and cutting the connecting groove simultaneously.

Fig. 9 is a fragmentary side view of Fig. 8 partly in section.

Fig. 10 shows the finished commutator.

Similar numerals refer to similar parts thruout the several views.

While commutators having any number of segments within reason may obviously be made by my process, I have selected one for illustrative purposes having seven segments.

Fig. 1 shows a sheet metal blank 20 having seven teeth 21, 21 etc., six whole spaces 22, 22 etc., and two half spaces 23 at the ends. While the shape of the teeth 21 and the spaces 22 may vary considerably from the contour shown, it is preferred that the teeth and spaces of a blank are exactly alike in size and shape and that the two half spaces 23 will make a whole space 22 when they are brought together.

Fig. 2 shows to a smaller scale how blanks 20 having teeth and spaces alike in contour may be taken from ribbon stock by cutting it apart on the zigzag line 24 and cutting in at the edges of the ribbon to the center of a space as at 25, 25 etc. This method provides blanks 20 without waste.

In Fig. 3 a blank 20 has been rolled to form a cylindrical ring 26 with the teeth 21 and spaces 22 at the one end, the plain edge 27 of the blank being at the other end of the ring.

By suitable tools the teeth on the end of the ring 26 are bent to form inwardly extending hooks 28, as shown on rings 29, 30 and 31, Figs. 4, 5 and 6 respectively. On ring 30 the plain edge 27 of a ring 29 has been flared outwardly to provide a flange 32 and on ring 31 an annular V groove 33 has been formed into a flange 32 of a ring 30 by pressure or other suitable means.

In Fig. 7 I show a mold 34 adapted to hold a ring 31 and to mold a core of insulation within it. The mold comprises a body 35, a plunger 36 and a center stud 37.

To operate the mold plunger 36 is removed and ring 31 put in place in body 35, the remaining space in the body being filled with the insulating material. Plunger 36 is then returned and forced downward to the position shown compressing the insulation to form the core 38 which extends about hooks 28 and into the V groove 33.

While the mold 34 shows a ring 31 having the V groove 33 as the preferred form it will be understood that where the commutator is to be run at relatively low speed, or when the ring is narrow, the core 38 may be molded into a ring 30 which does not have the V groove, or, where no risers are desired on the commutator segments, the core may be molded into a ring 29 by suitably modifying the mold 34.

After the core has been molded into the ring the structure is removed from the mold and the ring is divided into segments 39 each having a riser 40 with a connecting notch 41 (see Fig. 10). The dividing is preferably done by sawing as shown in Figs. 8 and 9 where dividing cuts 42 and connecting notches 41 are simultaneously made.

The dividing saw 43 is preferably set on a radial plane of the ring 31, but since the angle of the notches 41 is not material a notching saw 44 may be carried on the same arbor in a plane parallel to saw 43 (see Fig. 8). By this arrangement a dividing cut 42 and a connecting notch 41 may be cut at each stroke of the machine.

From a consideration of Fig. 9 the object of the spaces 22 is apparent, for, if hooks 28 were not separated by these spaces it would be necessary to saw almost thru core 38 to separate the metal part of the structure into segments, which would result in a weakened core. Because of spaces 22 it is necessary to saw but slightly deeper than the thickness of the metal from which blank 20 is made (see Fig. 9).

While in the foregoing I have illustrated and described a procedure whereby I attain the objects of my invention, considerable variation may be permited without departing from the principles involved, and it is therefore with a view of extending the scope of the invention to include such variation that I claim—

1. The method of making a commutator, which consists of cutting sheet metal to provide a blank having one toothed edge and one plain edge, bending the blank to provide a cylinder having teeth at one end and the other end plain, bending the teeth inward then axially into the inside of the cylinder to provide anchors, flaring the plain end obliquely outwardly to provide a flange for risers, pressing an annular groove into the outer surface of said flange, molding a core of insulation into the inside of said cylinder, about said anchors, and outwardly along the outer surface of said flange and into said annular groove, and dividing the cylinder into segments by making a series of axial cuts having a radial depth extending through but not farther than the inside diameter of said cylinder.

2. A commutator comprising a hub of insulation, a series of curved, spaced apart sheet metal strips overlying said hub, one end of each said strips extending inwardly into the hub near the end thereof thence axially to near the middle of said hub, the other end of each strip being flared obliquely outwardly away from the axis of the commutator and having a circumferentially extending groove in the outer end surfaces of said flared portions, and integral parts of said hub extending outwardly along the flared portions of the strips and into said grooves.

In testimony whereof I have hereunto signed my name.

VINCENT G. APPLE.